S. E. ROBERTSON.
WHEEL.
APPLICATION FILED MAY 31, 1921.

1,419,762.

Patented June 13, 1922.

S. E. Robertson, INVENTOR

BY Victor J. Evans, ATTORNEY

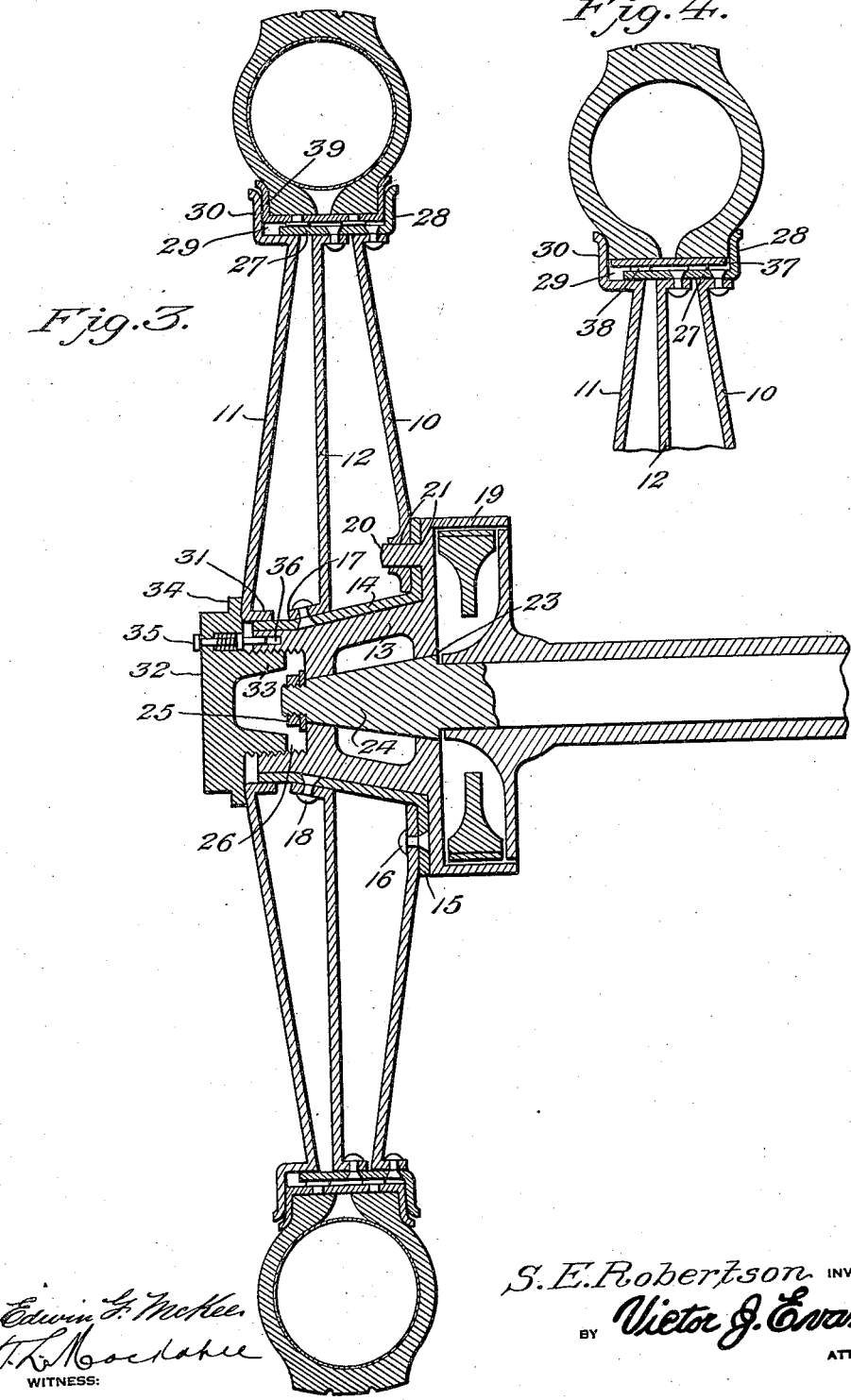

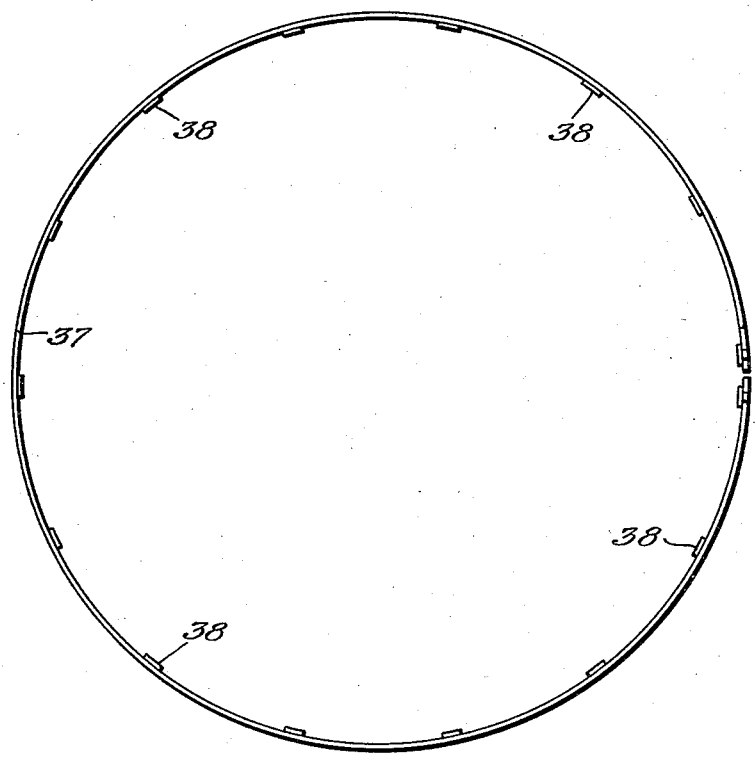
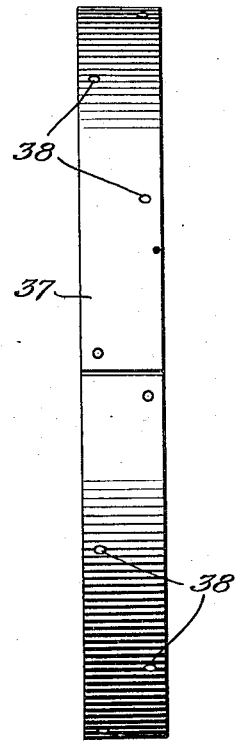
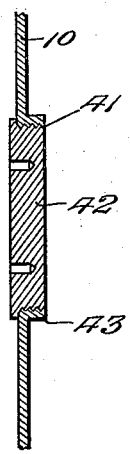

UNITED STATES PATENT OFFICE.

SIDNEY E. ROBERTSON, OF MEDON, TENNESSEE.

WHEEL.

1,419,762.  Specification of Letters Patent.  Patented June 13, 1922.

Application filed May 31, 1921. Serial No. 474,043.

*To all whom it may concern:*

Be it known that I, SIDNEY E. ROBERTSON, a citizen of the United States, residing at Medon, in the county of Madison and State of Tennessee, have invented new and useful Improvements in Wheels, of which the following is a specification.

This invention relates to vehicle wheels and has for an object the provision of a wheel of the disk type, which is relatively light in weight, but strong and durable in construction and which may be easily attached to or removed from the axle spindle.

Another object is the provision of a wheel of the above character from which a tire may be easily and quickly removed, or thereafter applied, the construction being such as to permit of receiving either an inflated or deflated pneumatic tire and in the latter event, the tire may be readily inflated after it has been secured in position.

With the above and other objects in view, the invention further includes the following novel features and details of construction, to be hereinafter more fully described, illustrated in the accompanying drawings, and pointed out in the appended claims.

In the drawings:—

Figure 3 is a sectional view of the wheel shown in position upon the axle.

Figure 4 is a detail sectional view showing a removable flangeless rim in position upon the wheel.

Figure 5 is a detail side view of the flangeless rim.

Figure 6 is an edge view of the same.

Figure 7 is an enlarged section showing the manner of closing the opening of the inner disk, through which access is had to the tire valve.

Figure 1:
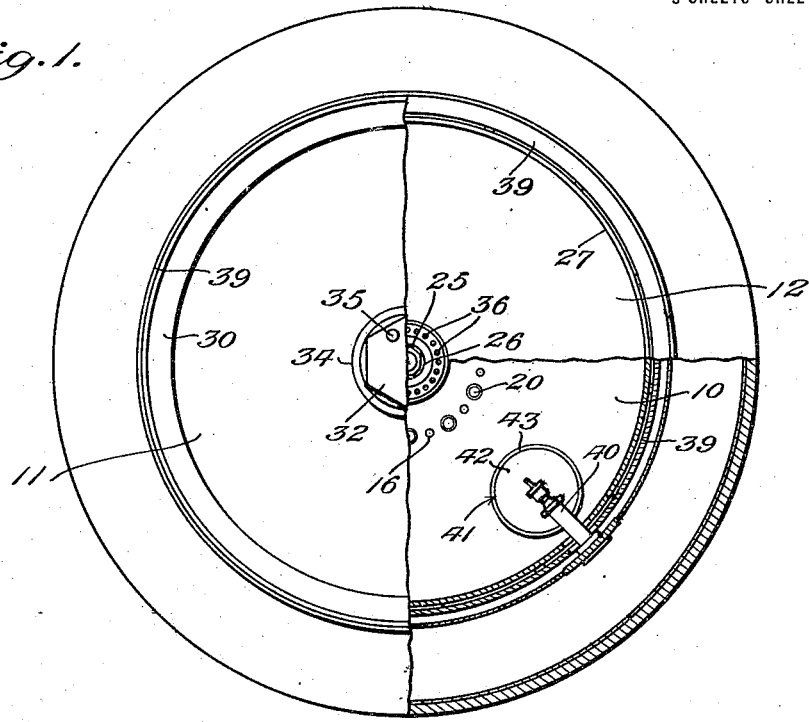
Figure 1 is an elevation looking at the outside of the wheel, the outer disk being partly broken away to more clearly illustrate the invention.
Figure 2:
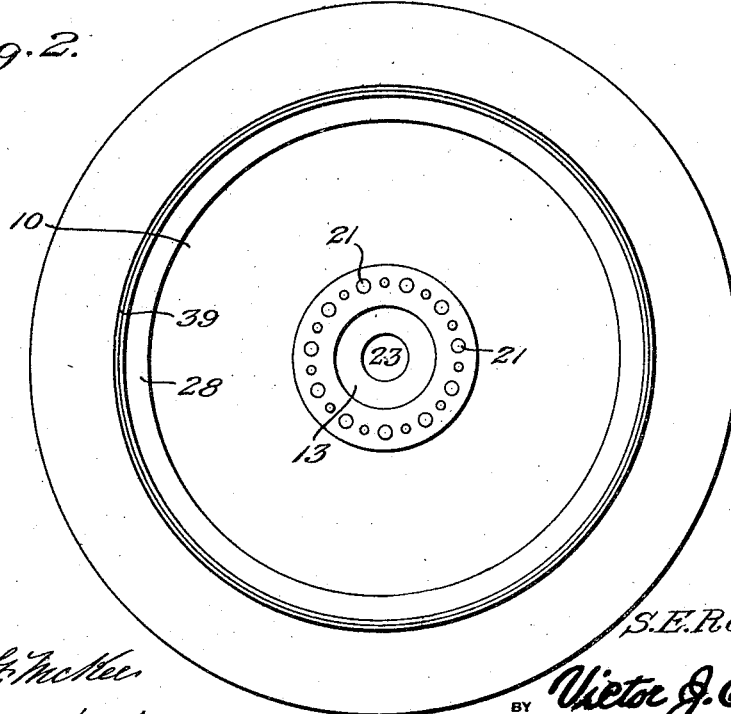
Figure 2 is an elevation looking at the inside of the wheel with the latter removed from the axle.

Referring in detail to the drawings, wherein like characters of reference denote corresponding parts, the reference character 10 indicates what will be hereinafter referred to as an inner disk, while 11 indicates an outer disk and 12 an intermediate disk.

The disks 10 and 12 are centrally connected by a hub 13, which includes a tapered sleeve 14, having an inner annular flange 15, to which the inner disk 10 is secured, as by rivets or other fastening devices 16. The intermediate disk 12 is provided with a central opening which is surrounded by a flange 17 and this flange is riveted or otherwise secured to the sleeve 14 as shown at 18. The sleeve 14 may be either permanently or removably secured to the hub proper 13 and in the latter event, the said hub 13 is provided with an inner annular flange 19 which carries a pin 20. This pin extends through aligned openings 21 formed in the flange 15 in the disk 10, so that relative rotary movement between the hub and sleeve is prevented. By providing an annulus 22 which extends from the flange 19, the hub may be utilized for the rear or driving wheel of the vehicle, the said annulus providing a braking surface, as will be readily understood. The hub 13 is provided with a spindle receiving opening 23 and may also be provided with suitable anti-friction devices (not shown). The spindle which is indicated at 24 extends through the hub and is secured in place through the medium of a nut or other fastening device 25, the latter being located within a socket 26 formed in the outer end of the hub.

Secured to the outer edges of the outer and intermediate disks 10 and 12 respectively is an annulus which is substantially L-shape in cross section so as to provide a bottom 27 and one side wall 28 of a demountable rim receiving channel 29. The opposite side wall of this channel is formed by an offset annular flange 30 carried by the outer disk 11.

This last mentioned disk is formed with a central opening which is surrounded by an inwardly extending flange 31, the latter being designed to take over the outer end of the sleeve 14, where it is removably held in position by means of a hub cap 32. This cap is formed with an inwardly extending threaded nipple 33 which engages the internally threaded portion of the socket 26 of the hub, while a flange 34 which forms a part of the cap engages that portion of the outer disk 11 immediately surrounding the central opening.

By removing the cap 32, the outer disk 10 may be easily detached so as to permit of the removal of the tire and readily attached after the tire has been replaced. In order to prevent the accidental removal of the outer disk 11, the cap 32 is equipped with a spring actuated locking key 35, whose inner end engages any one of a number of sockets 36 arranged concentrically around the outer edge of the hub 13.

The wheel is capable of receiving a tire either in an inflated or a deflated condition, that is, a tire which is already inflated may be placed within the channel 29, or a deflated tire placed therein and the latter afterward inflated. When positioning a deflated tire, it is preferred to use the flangeless rim shown in Figures 5 and 6, wherein a split rim 37 is shown, whose cross section is flat. It is preferred to provide this rim 37 with inwardly extending lugs or projections 38 for contact with the bottom 27 of the channel 29 so as to reduce friction when replacing or removing the rim. When using the rim 37 the latter may be placed within the channel 29 and the deflated tire readily slipped thereover, whereupon the outer disk 11 may be secured in place to the side walls 28 and 30 of the rim receiving channel and will serve to hold the tire in position. In Figure 3 of the drawings the usual demountable rim 39 is illustrated.

In order to obtain access to the valve 40 for the purpose of inflating the tire after it has been placed upon the wheel, the inner disk 10 is provided with an opening 41 which is located opposite the valve 40 so that the latter may be easily arranged. It is preferred to close the opening by means of a dust cap 42 which threadedly engages a flange 43 surrounding the opening 41.

The invention is susceptible of various changes in its form, proportions and minor details of construction and the right is herein reserved to make such changes as properly fall within the scope of the appended claims.

Having described the invention what is claimed is:—

1. A vehicle wheel embodying an inner disk, an outer disk, an intermediate disk located between the inner and outer disks, a hub secured to and centrally connecting the inner and intermediate disks, a transversely L-shaped annulus secured to and surrounding the outer edges of the last mentioned disks, said annulus forming the bottom and one side edge of a rim receiving channel, a flange surrounding the outer edge of the outer disk and providing the opposite side edge of said channel and means for removably securing the outer disk in position.

2. A vehicle wheel embodying an inner disk, an outer disk, an intermediate disk located between the inner and outer disks, a hub secured centrally and connecting the inner and intermediate disks, a transversely L-shaped annulus secured to and surrounding the outer edges of the last mentioned disks, said annulus forming the bottom and one side edge of a rim receiving channel, a flange surrounding the outer edge of the outer disk and providing the opposite side edge of said channel, an inwardly extending flange surrounding an opening located centrally of said outer disk for engagement around the outer end of the hub and a cap removably secured to the hub and engageable with the outer disk to hold the latter in position.

In testimony whereof I affix my signature.

SIDNEY E. ROBERTSON.